US006479794B1

(12) United States Patent
Sykes et al.

(10) Patent No.: US 6,479,794 B1
(45) Date of Patent: Nov. 12, 2002

(54) ENGINE DRIVEN WELDING POWER SUPPLY WITH DIG CIRCUIT

(75) Inventors: Allen Sykes, Greenville, WI (US); Jon Reynolds, Appleton, WI (US); Michael J. Brace, Greenville, WI (US)

(73) Assignee: Illinois Tool Works Inc., Glenview, IL (US)

( * ) Notice: Subject to any disclaimer, the term of this patent is extended or adjusted under 35 U.S.C. 154(b) by 10 days.

(21) Appl. No.: 09/711,814

(22) Filed: Nov. 13, 2000

Related U.S. Application Data

(63) Continuation-in-part of application No. 09/706,224, filed on Nov. 3, 2000.

(51) Int. Cl.[7] .................................................. B23K 9/10
(52) U.S. Cl. ................................... 219/133; 219/137 PS
(58) Field of Search ............................. 219/133, 130.1, 219/130.4, 134, 137 PS

(56) References Cited

U.S. PATENT DOCUMENTS

| 2,734,981 | A | * | 2/1956 | Bichsel et al. ............ 219/130.1 |
|---|---|---|---|---|
| 3,444,430 | A | * | 5/1969 | Needham .................. 219/130.4 |
| 3,530,359 | A |   | 9/1970 | Grist |
| 3,899,652 | A | * | 8/1975 | Terry et al. .................. 219/133 |
| 3,928,746 | A | * | 12/1975 | Ericsson ................. 219/130.33 |
| 4,314,195 | A | * | 2/1982 | Muter ......................... 219/133 |
| 4,897,773 | A |   | 1/1990 | Bilczo |
| 4,999,563 | A | * | 3/1991 | Suzuki ........................ 219/133 |

OTHER PUBLICATIONS

Miller The Power of Blue Big Blue ® 302D.

* cited by examiner

*Primary Examiner*—Clifford C. Shaw
(74) *Attorney, Agent, or Firm*—George R. Corrigan

(57) ABSTRACT

An engine driven welding power supply including a welding output winding, and a dig output winding is disclosed. The welding output winding has a welding output with a welding V-A curve of a first slope, in a welding range and below the welding range. The dig output winding has a dig output with a dig V-A curve of a second slope below the welding range. The second slope is less steep than the first slope. An output circuit is connected to receive and combine the welding and dig outputs to provide a power supply output.

26 Claims, 2 Drawing Sheets

US 6,479,794 B1

ENGINE DRIVEN WELDING POWER SUPPLY WITH DIG CIRCUIT

RELATED APPLICATIONS

This is a continuation-in-part of application Ser. No. 09/706,224, filed Nov. 3, 2000, entitled Engine Driven Welding Power Supply With Dig Circuit.

FIELD OF THE INVENTION

The present invention relates generally to the art of welding power supplies. More specifically, it relates to engine driven welding power supplies that include a dig and/or a hot start output.

BACKGROUND OF THE INVENTION

Engine driven welding power supplies may be powered by a DC generator or an AC generator (also called an alternator-rectifier). An AC generator generally includes, in addition to an alternator, a reactor followed by rectifiers to provide a DC output. AC driven welding power supplies are, generally, constant current type machines and the output volt-ampere characteristic of an AC driven welding power supply typically has a negative, slope (decreasing voltage results in increasing current). That is, the output current is nearly constant over a varying range of output voltage. Such welding power supplies are particularly well suited for welding applications requiring an approximately constant current output (such as flat plate welding). Output current changes over a wide range are often provided by selecting a tap on the reactor. One such prior art engine-driven welding power supply is the Miller Big Blue 302® welding power supply.

An engine driven welding power supply, as used herein, is a welding power supply that may be powered by a generator. It can include (but is not limited to) the engine and the generator. A welding V-A curve, as used herein, is the graph formed when output voltage is plotted against output current. Generally, the current is on the horizontal axis and the voltage on the vertical axis. The output V-A curve slope is the slope of the graph, and a less steep slope means that a decrease in arc voltage results in a greater increase in output current. Welding range, as used herein, refers to the portion of the output curve at which welding is typically performed, such as from about 20 volts to about 40–50 volts. The V-A curve over the welding range for a constant current machine typically has an almost vertical slope. Below a welding range, as used herein, refers to an output voltage less than that at which welding is typically performed (less than about 20 volts in some systems). A dig output, as used herein, refers to the output below a typical welding range where current increases as arc length (and hence arc voltage) decreases. A hot start output, as used herein, also refers to the output below a typical welding range, and allows the welding process to be initiated with a greater current than the current that will be provided after the process has reached its operating point. The hot start current is often provided at a reduced output voltage, below the welding range, where the V-A curve has less steep slope. The range at which a dig output or a hot start output is provided is below the welding range, even though welding may be performed by the dig and/or hot start output.

A dig output is desirable to provide the user with control of the heat into the weld puddle. With a dig output, shortening the arc length reduces output voltage, which increases output current, and thus increases heat unto the weld puddle. Likewise, a hot start is desirable because it allows the welding process to be started with additional heat.

DC welding generators have a V-A output curve such that as output voltage decreases, output current increases, i.e., suitable DC machines provide a "droop" or a natural dig in the V-A curve. Thus, a welder using a DC driven welding power supply can control the temperature of the welding puddle by varying the distance of the electrode from the workpiece. When the electrode is pulled back, the arc (output) voltage increases while the output current decreases. When the electrode is in close proximity to the workpiece, the arc voltage decreases (short circuit condition) while the output current increases.

AC generators do not have the natural dig output. One prior art engine-driven welding power supply system described in U.S. Pat. No. 5,734,147, issued Mar. 31, 1998, entitled Method And Apparatus For Electronically Controlling The Output Of A Generator Driven Welding Power Supply, hereby incorporated by reference, provides a dig and hot start output by electronic field control shaping of the V-A curve. Electronic field control allows the output V-A curve to be shaped as desired, including providing a dig output and hot start output below the welding range. However, such an engine-driven welding power supply is relatively complex, has a response slowed by the inductance of the field windings, and while suitable for some welding applications such as pipe welding, provides more versatility (and expense) than needed for other welding applications.

Other systems that provide a dig output use an inverter or converter based power supply, such as the power supply disclosed in U.S. Pat. No. 6,107,602, entitled Switchable power supply with electronically controlled output curve and adaptive hot start, issued Aug. 22, 2000 to Geissler, et. al. Such power supplies can provide a dig output by controlling the converter/inverter output. However, converter/inverter power supplies tend to be more complex, and suitable for particular applications.

AC systems that do not have electronic field control for output curve shaping, such as the Miller Big Blue 302®, do not have a ready means of providing a dig output and a hot start output. The V-A curve does not provide a substantially vertical slope over the welding range and a less steep slope below the welding range for the dig output. Accordingly, an engine-driven welding power supply system that provides for a dig output and/or a hot start output created other than by field control is desirable. Preferably, such a system will be economical, and will be readily provided without complex circuitry.

SUMMARY OF THE PRESENT INVENTION

According to a first aspect of the invention an engine driven welding power supply includes a welding output winding, and a second output winding. The welding output winding has a welding output with a welding V-A curve of a first slope, both in a welding range and below the welding range. The second output winding has a second output with a second V-A curve of a second slope below the welding range. The second slope is less steep than the first slope. An output circuit is connected to receive and combine the welding and second outputs to provide a power supply output.

According to a second aspect of the invention an engine driven welding power supply includes a welding output winding with a welding output, and a second output winding with a second output. An output circuit receives and combines the welding and second outputs to provide a power supply output with a breakpoint at a threshold at the bottom of a welding range.

A resistor is between the second output winding and the output circuit, or the coupling of the second output winding is less than the coupling of the welding output winding in various embodiments.

The welding and second output windings are part of separate generators, or part of the same generator, in other embodiments.

A rectifier circuit is disposed between the second output winding and the output circuit, and/or the combination of the second output winding and the rectifier circuit is in parallel with the welding output winding in various embodiments.

The second winding is a dig winding and the second output is a dig output, and/or the second winding is a hot start winding and the second output is a hot start output in other alternatives.

According to a third aspect of the invention a method of providing welding power output includes generating welding power from a welding winding. The welding power has a V-A curve with a first slope in and below a welding range. Additional power is generated from a second winding. The additional power has a V-A curve with a second slope below the welding range, and the second slope is less steep than the first slope. The welding power and additional power are added to provide the welding power output.

According to a fourth aspect of the invention a method of providing welding power output includes generating welding power, generating additional power, and adding the additional power and the welding power to provide a welding output having a breakpoint at a threshold at the bottom of a welding range.

The additional power is provided through an impedance, and/or generating additional power includes generating impedance-limited power in alternatives.

Generating welding power includes turning one or two generators in other alternatives.

The additional power is rectified, is dig power, and/or is hot start power in various alternatives.

Other principal features and advantages of the invention will become apparent to those skilled in the art upon review of the following drawings, the detailed description and the appended claims.

Figure 1:
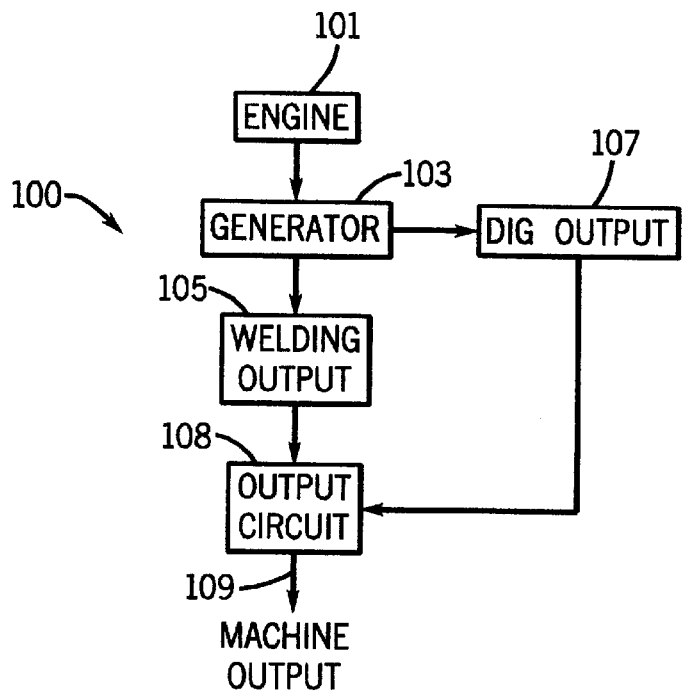
FIG. 1 is block diagram of an engine-driven welding power supply system constructed in accordance with the present invention.

Before explaining at least one embodiment of the invention in detail it is to be understood that the invention is not limited in its application to the details of construction and the arrangement of the components set forth in the following description or illustrated in the drawings. The invention is capable of other embodiments or of being practiced or carried out in various ways. Also, it is to be understood that the phraseology and terminology employed herein is for the purpose of description and should not be regarded as limiting. Like reference numerals are used to indicate like components.

DETAILED DESCRIPTION OF THE PREFERRED EMBODIMENTS

While the present invention will be illustrated with reference to a particular engine-driven welding power supply system it should be understood at the outset that the invention may be implemented with other circuitry, systems, generators, etc.

Figure 3:
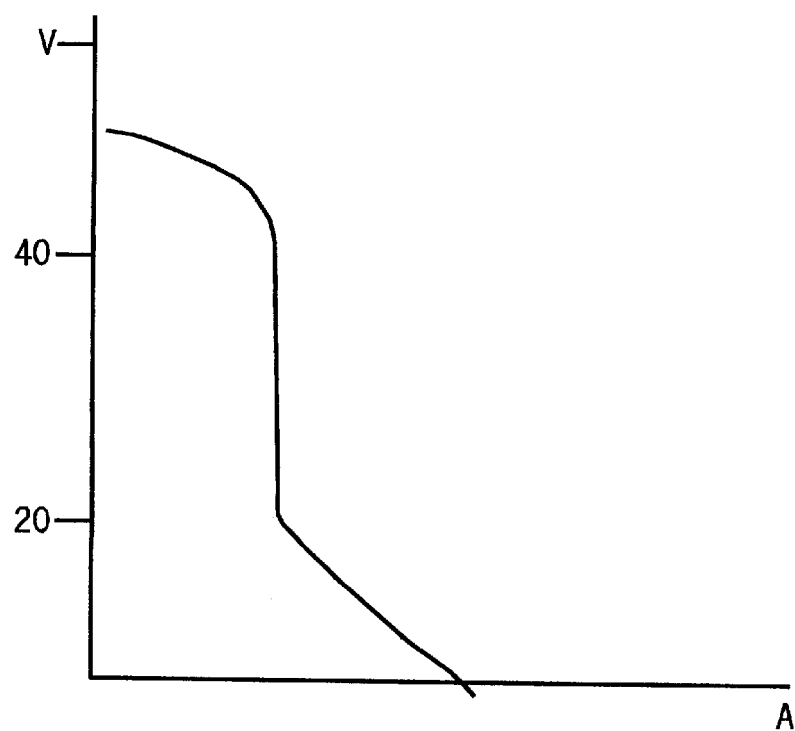
FIG. 3 is a graph showing a VA curve in accordance with the present invention.

Generally, the present invention includes an engine-driven welding power supply system that provides a typical welding output, such as a constant-current output, and a dig output. The outputs are combined and the V-A output curve has a breakpoint (a change of slope) at a threshold at the low end of a welding range. Thus, in the welding range, such as between about 20 and 40 volts, the output is generally constant current, but at low output voltages, such as below about 20 volts, the current increases as output voltage decreases. A graph showing an example of the output is shown in FIG. 3. The dig output may also be used as a hot start output, to provide a hot start when the welding process is initiated.

A block diagram of an engine-driven welding power supply system constructed in accordance with the present invention is shown in FIG. 1 and includes an engine or primary mover 101, a generator 103, a welding output 105, a dig output 107 and an output circuit 108 that cooperate to provide a machine output 109 (or power supply output), such as the graph of FIG. 3.

Engine 101 rotates a shaft that turns generator 103. A welding output winding provides welding output 105 and a dig output winding provides dig output winding 107. Output circuit 108 adds the outputs so that machine output 109 is the combination of outputs 107 and 105. Preferably, the connection from dig output 107 to output circuit 108 is one-directional so that as the output voltage increases, dig output 107 is back biased. Thus, at voltages above about 20 volts, dig output has no effect on machine output 109. But, at output voltages less than about 20 volts, dig output 107 provides machine output 109 with a slope less steep than the slope above about 20 volts.

Figure 2:
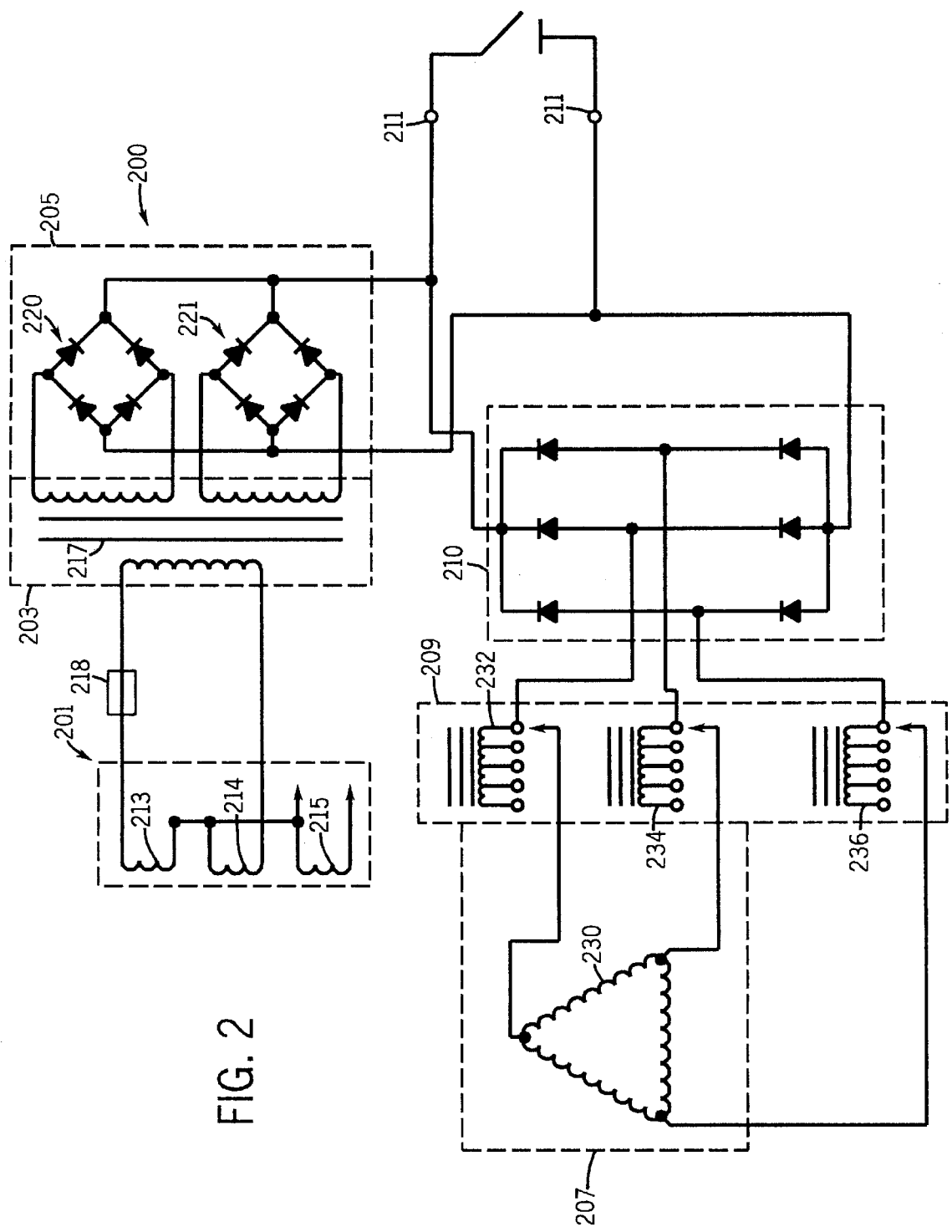
FIG. 2 is a circuit diagram of an engine-driven welding power supply system constructed in accordance with the preferred embodiment.

A schematic diagram of a welding power supply that implements the present invention is shown in FIG. 2 and includes a dig stator 201, a dig transformer 203, a dig rectifier circuit 205, a welding stator 207, a welding reactor 209, and a welding rectifier 210, which provide the machine output to output terminal 211. The preferred embodiment is implemented using a Miller Big Blue 302® engine-driven welding power supply system, including the controls used for the welding output. Generally course current control is provided by selecting a tap on a reactor, and fine control of the welding output is controlled by increasing the field current to increase output current, and decreasing field current to decrease output current. The field current is increased or decreased in response to current feedback being compared to a user selected current setpoint. In an alternative embodiments no field current control is used, or the power supply system of U.S. Pat. No. 5,734,147, and at least a part of the electronic field control is used to control the weld output.

Dig stator 201 includes dig windings 213, 214 and 215, which also provide an auxiliary power output (such as 110 or 220 VAC) in the preferred embodiment. Dig windings 213–215 do not share the stator with welding output windings, so that field control of the welding output does not affect the dig output.

Rather, the auxiliary field control is such that a desirable constant voltage aux output is provided. Dig windings 213 and 214 (also called second windings 213 and 214) are loosely coupled (lower coefficient of coupling than welding output windings and/or auxiliary output windings) to provide a drooping output—as the dig output voltage decreases, dig current increases (even though the aux output is constant voltage). The response is fast because inductance of the field windings does not slow the response of the dig output.

One alternative embodiment provides that the drooping output is obtained through an impedance, such as a resistor 218, on the output of windings 213 and 214. Resistor 218, shown between the dig windings and the output circuit, is not included in the preferred embodiment. Both the preferred and alternative embodiments thus provide an impedance-limited dig output (i.e. a drooping output). Another alternative provides that some or all of the dig output comes from a winding on the welding generator. This causes the dig threshold to vary with the welding output.

The output of dig windings 213 and 214 is provided to transformer 217 which steps the voltage down so that the rectified dig voltage at no current is about 20 volts (19 volts in the preferred embodiment). The secondary outputs of transformer 217 are rectified by full-wave rectifiers 220 and 221 (rectifier circuits), and combined as a rectified dig output. The rectified dig output has no current above approximately 20 volts, and provides increasing current (up to the about 85–90 amps in the preferred embodiment) as output voltage decreases. Output terminals 211 are connected to receive the rectified dig output. The rectifiers also block the welding output from providing current into the dig circuit, including the transformer and dig windings.

The dig output also is a hot start output for contact starts. When the welding process is started with a contact start (short circuit) additional current is provided, thus providing a hot start.

Welding stator 207 includes a three phase welding winding whose output is provided to a plurality of tapped reactors 232, 234 and 236. Tapped reactors 232–236 are conventional tapped reactors used for welding output range selection. The output of tapped reactors 232–236 is rectified by rectifier circuit 210. The output of rectifier circuit 210 is the welding output, over the range of about 10–500 amps in the preferred embodiment, and is provided to terminals 211, and thus combined with or added to the dig output to provide a maximum machine output of about 750 amps (short circuit). The dig output and the welding output are in parallel across an output circuit that includes output terminal 211. The welding output is a typical constant current type welding output.

The welding windings and dig windings are part of a single generator (one rotating shaft) with separate rotors, stators (output windings), and field windings in the preferred embodiment. However, in alternative embodiments there are two generators (two shafts), or a single rotor and field windings, with two output windings. In various embodiments the welding and/or dig generators are single, two, three or other multi-phase generators. Another embodiment provides a phase-shifted dig output (with respect to the welding output) to help smooth the output. Additional embodiments include providing a separate dig transformer on a conventional transformer/rectified welding power supply, or with a resistance grid welding power supply. (Not necessarily an engine driven power supply).

Numerous modifications may be made to the present invention which still fall within the intended scope hereof. Thus, it should be apparent that there has been provided in accordance with the present invention a method and apparatus for an engine-driven welding power supply system that fully satisfies the objectives and advantages set forth above. Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

The embodiments of the invention in which an exclusive property or privilege is claimed are defined as follows:

1. An engine driven welding power supply comprising:
   a welding output winding, having a welding output with a welding V-A curve of a first slope in a welding range and below the welding range;
   a second output winding, having a second output with a second V-A curve of a second slope below the welding range, wherein the second slope is less steep than the first slope; and
   an output circuit, connected to receive the welding and second outputs, wherein the output circuit adds the welding and second outputs to provide a power supply output.

2. The power supply of claim 1, further including a resistor disposed between the second output winding and the output circuit.

3. The power supply of claim 1, wherein the coupling of the second output winding is less than the coupling of the welding output winding.

4. The power supply of claim 3, wherein the welding output winding is part of a first generator, and the second output winding is part of a second generator.

5. The power supply of claim 4, further including a rectifier circuit disposed between the second output winding and the output circuit.

6. The power supply of claim 5, wherein the combination of the second output winding and the rectifier circuit is in parallel with the welding output winding.

7. The power supply of claim 1, wherein the welding output winding is part of a first generator, and the second output winding is part of the first generator.

8. The power supply of claim 1, wherein the second winding is a dig winding and the second output is a dig output.

9. The power supply of claim 1, wherein the second output is a hot start output.

10. An engine driven welding power supply comprising:
    a welding output winding, having a welding output;
    a second output winding, having a second output; and
    an output circuit, connected to receive the welding and second outputs, wherein the output circuit adds the welding and second outputs to provide a power supply output, wherein the power supply output has a breakpoint at a threshold at the bottom of a welding range.

11. The power supply of claim 10, further including a rectifier circuit disposed between the second output winding and the output circuit, wherein:
    the coupling of the second output winding is less than the coupling of the welding output winding;
    the welding output winding is part of a first generator, and the second output winding-is part of a second generator; and
    wherein the combination of the second output winding and the rectifier circuit is in parallel with the welding output winding.

12. An engine driven welding power supply comprising:

a welding output winding means for providing a welding output with a welding V-A curve of a first slope in a welding range and below the welding range;

a second output winding means for providing a second output with a second V-A curve of a second slope below the welding range, wherein the second slope is less steep than the first slope; and output means for receiving and adding the welding and second outputs and providing them as a power supply output.

13. The power supply of claim 12, wherein the welding output winding means is part of a first generator means for generating welding power, and the second output winding is part of a second generator means for generating power.

14. The power supply of claim 13, further including a rectifier means for rectifying the second output, disposed between the second output winding means and the output means.

15. The power supply of claim 14, wherein the combination of the second output winding means and the rectifier means is in parallel with the welding output winding means.

16. An engine driven welding power supply comprising:

a welding output winding means for providing a welding output;

a second output winding means for providing a second output; and an output means for receiving and adding the welding and second outputs to provide a power supply output having a breakpoint at a threshold at the bottom of a welding range.

17. The power supply of claim 16, further including a rectifier means for rectifying the second output, disposed between the second output winding means and the output means, wherein:

the welding output winding means is part of a first generator means for providing welding power, and the second output winding means is part of a second generator means for providing dig power; and wherein the combination of the second output winding means and the rectifier means is in parallel with the welding output winding means.

18. A method of providing welding power output comprising:

generating welding power from a welding winding, wherein the welding power has a V-A curve with a first slope in a welding range and below the welding range;

generating additional power from a second winding, wherein the additional power has a V-A curve with a second slope below the welding range, further wherein the second slope is less steep than the first slope; and adding the welding power and additional power to provide the welding power output.

19. The method of claim 18, further including providing the additional power through an impedance.

20. The method of claim 18, wherein generating additional power includes generating impedance-limited power.

21. The method of claim 20, wherein generating welding power includes turning a first generator and generating additional power includes turning a second generator.

22. The method of claim 21, further including rectifying the additional power.

23. The method of claim 18, wherein generating additional power includes generating dig power.

24. The method of claim 18, wherein generating additional power includes generating power for a hot start.

25. A method of providing welding power comprising:

generating welding power;

generating additional power; and adding the additional power and the welding power to provide a welding output having a breakpoint at a threshold at the bottom of a welding range.

26. The method of claim 25, further including rectifying the additional power.

* * * * *